United States Patent
Sonoda et al.

(10) Patent No.: US 9,752,589 B2
(45) Date of Patent: Sep. 5, 2017

(54) AIRFOIL GEOMETRY OF BLADE FOR AXIAL COMPRESSOR

(71) Applicant: Honda Motor Co., Ltd., Tokyo (JP)

(72) Inventors: Toyotaka Sonoda, Wako (JP); Toshiyuki Arima, Wako (JP); Giles Endicott, Offenbach/Main (DE); Markus Olhofer, Offenbach/Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 14/278,048

(22) Filed: May 15, 2014

(65) Prior Publication Data
US 2014/0356156 A1 Dec. 4, 2014

(30) Foreign Application Priority Data
May 28, 2013 (DE) .......... 10 2013 209 966

(51) Int. Cl.
*F04D 29/38* (2006.01)
*F04D 29/54* (2006.01)
(Continued)

(52) U.S. Cl.
CPC .......... *F04D 29/384* (2013.01); *F01D 5/141* (2013.01); *F04D 21/00* (2013.01); *F04D 29/324* (2013.01);
(Continued)

(58) Field of Classification Search
CPC ........ F04D 29/38; F04D 29/54; F04D 29/544; F04D 29/324; F01D 5/141
(Continued)

(56) References Cited

U.S. PATENT DOCUMENTS 2,935,246 A 5/1960 Roy
4,123,196 A * 10/1978 Prince, Jr. .......... F04D 21/00
                                                     137/15.2
(Continued)

FOREIGN PATENT DOCUMENTS

DE 10 2008 036 294 2/2010
DE 10 2009 013 399 9/2010
(Continued)

OTHER PUBLICATIONS

European Search Report dated Mar. 10, 2015, 3 pages.
German Search Report dated Jan. 23, 2014. English translation included.

*Primary Examiner* — Michael R Reid
*Assistant Examiner* — Christopher Ballman
(74) *Attorney, Agent, or Firm* — Rankin, Hill & Clark LLP

(57) ABSTRACT

A suction surface of a blade forming a blade row of an axial compressor includes a concave region having a negative curvature at a leading edge part, and a flat region having substantially zero curvature continued rearwardly of the concave region, so that multiple compression waves are generated, enabling moderation of magnitude of a 1st passage shock to reduce pressure loss and suppress boundary layer separation on the suction surface. Providing a concave region having a negative curvature in a frontal part on a pressure surface of the blade suppresses an increase in the airflow velocity in the frontal part, thus weakening a 2nd passage shock generated on the pressure surface to enable reduction of pressure loss. The concave region of the pressure surface may be extended from a position having a chord length of no greater than 10% to a position having at least 20%.

11 Claims, 5 Drawing Sheets

(51) Int. Cl.
   *F04D 29/32*     (2006.01)
   *F01D 5/14*      (2006.01)
   *F04D 21/00*     (2006.01)

(52) U.S. Cl.
   CPC ............. *F04D 29/38* (2013.01); *F04D 29/54* (2013.01); *F04D 29/544* (2013.01); *Y02T 50/673* (2013.01)

(58) Field of Classification Search
   USPC .................................... 415/208.1; 416/223 R
   See application file for complete search history.

(56) References Cited

U.S. PATENT DOCUMENTS

| | | | | |
|---|---|---|---|---|
| 4,455,003 A | * | 6/1984 | Hilbig | B64C 3/14 244/35 R |
| 6,099,249 A | * | 8/2000 | Hashimoto | F01D 5/142 415/181 |
| 6,358,012 B1 | * | 3/2002 | Staubach | F01D 5/141 416/228 |
| 6,651,927 B1 | * | 11/2003 | Hackett | B64C 3/14 244/35 R |
| 7,484,937 B2 | * | 2/2009 | Johann | F01D 5/141 416/228 |
| 2002/0021968 A1 | | 2/2002 | Olhofer et al. | |
| 2003/0143079 A1 | * | 7/2003 | Kawarada | F01D 5/141 416/243 |
| 2004/0228732 A1 | | 11/2004 | Sonoda et al. | |
| 2006/0140772 A1 | * | 6/2006 | McMillan | F01D 5/147 416/241 R |
| 2008/0118362 A1 | | 5/2008 | Hu et al. | |
| 2011/0097210 A1 | * | 4/2011 | Kirtley | F01D 5/141 416/223 A |
| 2011/0206527 A1 | | 8/2011 | Harvey et al. | |

FOREIGN PATENT DOCUMENTS

| | | |
|---|---|---|
| EP | 0732505 | 9/1996 |
| EP | 1510652 | 3/2005 |
| FR | 2 165 704 | 10/1973 |
| GB | 916896 | 1/1963 |
| JP | 08-254156 | 10/1996 |

\* cited by examiner

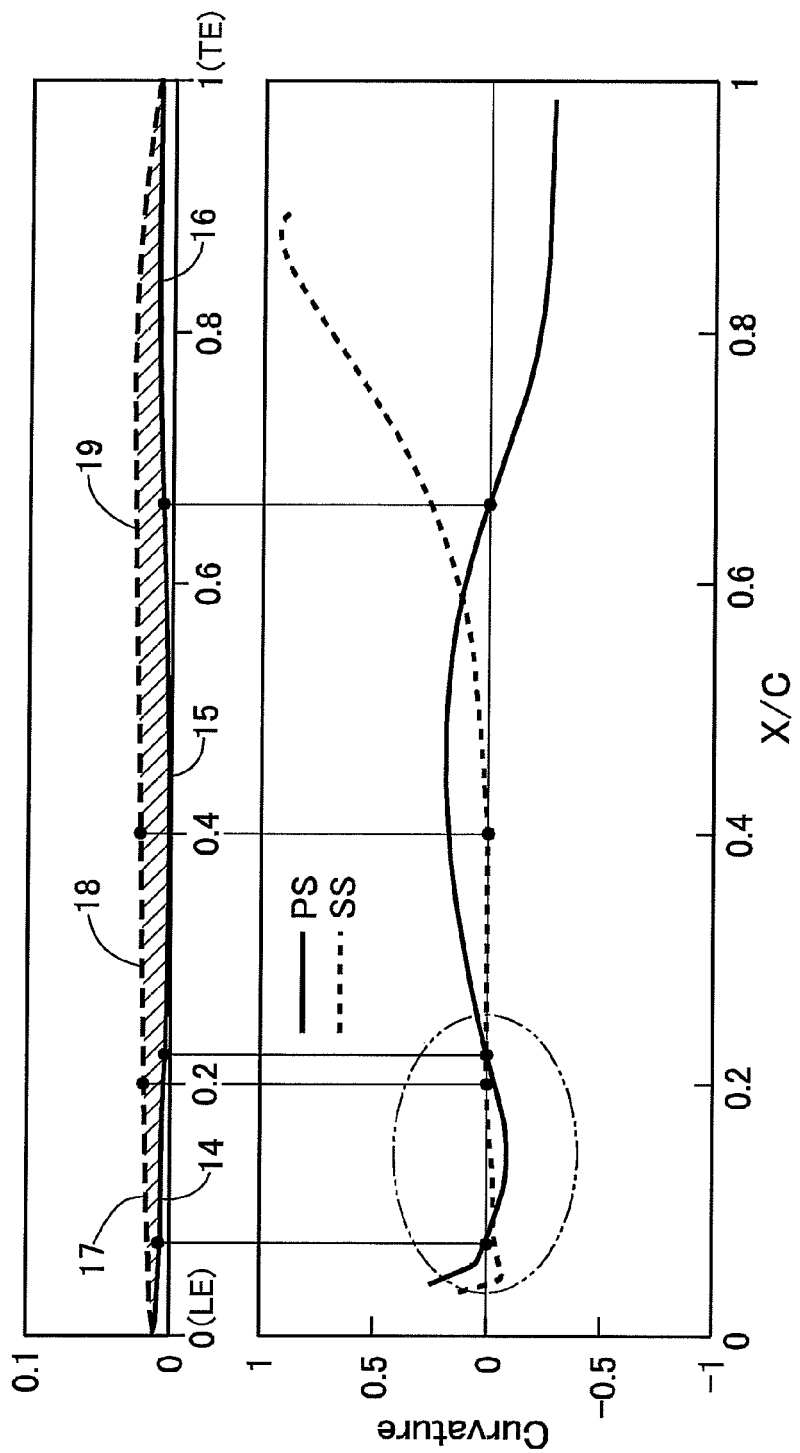

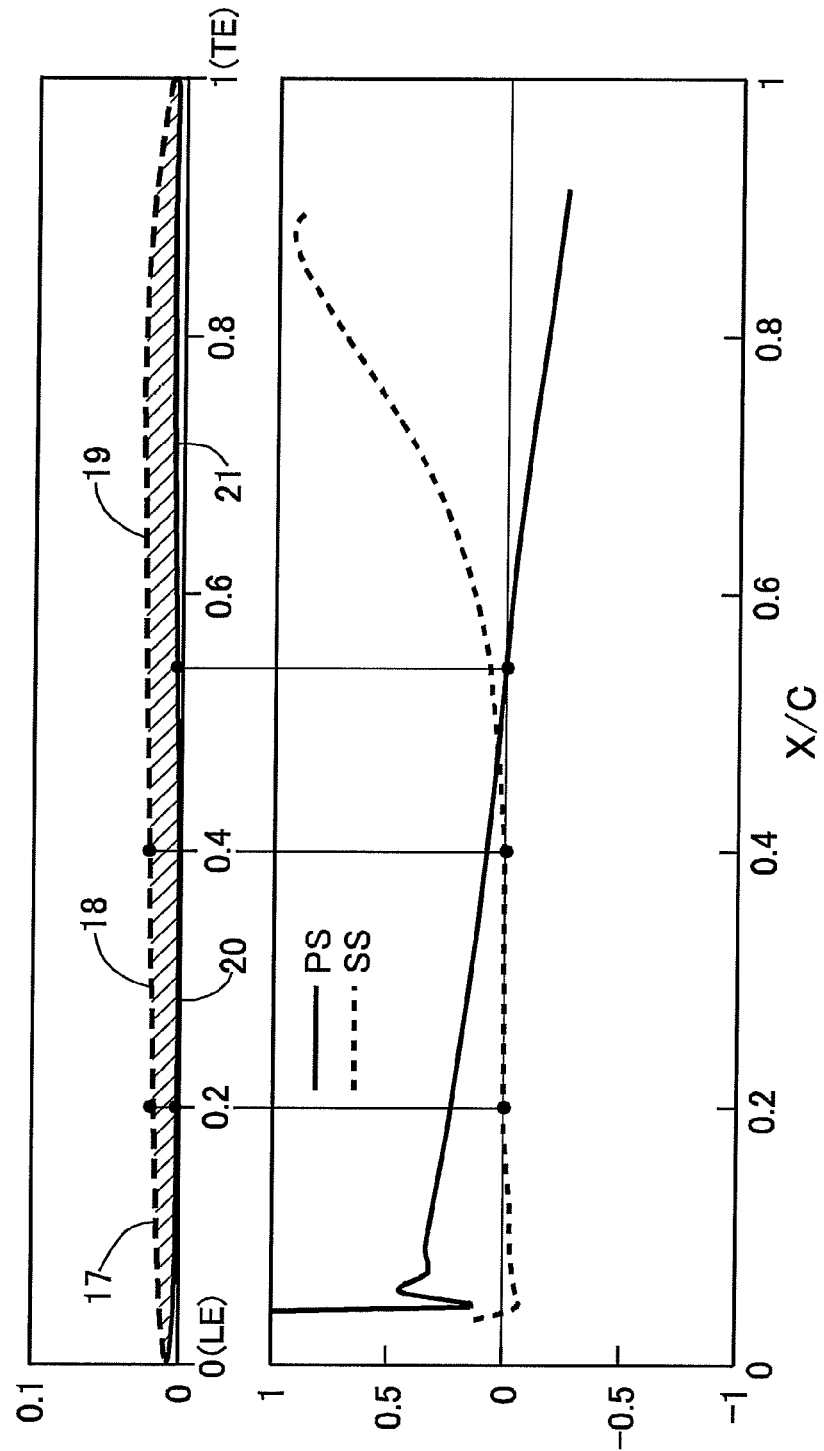

EMBODIMENT

COMPARATIVE EXAMPLE

AIRFOIL GEOMETRY OF BLADE FOR AXIAL COMPRESSOR

CROSS REFERENCES TO RELATED APPLICATIONS

The present application claims priority under 35 U.S.C. §119 to German Patent Application No. 102013209966.5 filed May 28, 2013 the entire contents of which are hereby incorporated by reference.

BACKGROUND OF THE INVENTION

Field of the Invention

The present invention relates to an airfoil geometry that can be suitably applied to a rotor blade or a stator blade of an axial compressor and, in particular, to an airfoil geometry that can reduce pressure loss by suppressing shock generated on a pressure surface PS (pressure side).

Description of the Related Art

When the velocity of an airflow entering a blade row of an axial compressor exceeds the speed of sound, since as shown in FIG. 5 in an air passage between two adjacent rotor blades of the blade row, one strong shock (1st passage shock) is generated from the leading edge LE of one rotor blade toward the suction surface SS (suction side) of the adjacent rotor blade, the airflow velocity on the suction surface SS of the rotor blade rapidly decreases immediately after the 1st passage shock, and not only does pressure loss increase, but there is also the problem that the compression efficiency of the compressor is degraded due to boundary layer separation on the suction surface SS of the rotor blade being induced by the 1st passage shock.

In order to solve such a problem, the airfoil geometry of a rotor blade of an axial compressor disclosed in Japanese Patent Application Laid-open No. 8-254156 is provided with a concave region, which has a negative curvature, at a position close to the leading edge LE of the suction surface SS, and the position of a bottom portion (a portion that is most depressed) of the concave region is set within a range of 0% to 70% of the chord length from the leading edge LE. In accordance with this arrangement, a plurality of weak compression waves are generated along the suction surface SS (suction side), so that the magnitude of the 1st passage shock can be moderated, deceleration of the airflow velocity is made gentle, and it thus becomes possible to reduce the pressure loss on the suction surface SS of the rotor blade and suppress boundary layer separation.

SUMMARY OF THE INVENTION

However, in the arrangement disclosed in Japanese Patent Application Laid-open No. 8-254156, since a portion close to the leading edge LE on the pressure surface PS (pressure side) of the airfoil geometry of the rotor blade is formed from a convex region having a positive curvature, the airflow velocity is accelerated in this convex region to thus generate a strong shock (2nd passage shock) from the pressure surface PS, thereby giving rise to the problem that the pressure loss is increased.

The present invention has been accomplished in light of the above-mentioned circumstances, and it is an object thereof to reduce pressure loss by suppressing a shock generated on the pressure surface side of blades forming a blade row of an axial compressor.

In order to attain the above object, in accordance with the present invention, there is proposed an airfoil geometry for an axial compressor, in which a suction surface of a blade forming a blade row of the axial compressor includes a concave region having a negative curvature, that is formed in a leading edge part of the suction surface, and a flat region having substantially zero curvature, that is continued to the rearward of the concave region, wherein the blade comprises a concave region having a negative curvature in a frontal part on a pressure surface. It is preferable that at least part of the concave region of the pressure surface is present within a range of 10% to 20% of the chord length, and it is more preferable that the concave region of the pressure surface is present so as to extend from a position having a chord length of no greater than 10% to a position having a chord length of at least 20%.

In accordance with the above arrangement, since the suction surface of the blade forming the blade row of the axial compressor includes the concave region having a negative curvature, that is formed in the leading edge part of the suction surface, and the flat region having substantially zero curvature, that is continued to the rearward of the concave region, the magnitude of the 1st passage shock can be moderated, deceleration of the airflow velocity before and after the 1st passage shock is thereby made gentle, and it is thus possible to reduce pressure loss and suppress boundary layer separation on the suction surface.

In addition thereto, since the blade includes the concave region having a negative curvature in the frontal part on the pressure surface, increase in the airflow velocity in the frontal part on the pressure surface is suppressed, a 2nd passage shock generated to the rear of the concave region is weakened, and it is thus possible to reduce pressure loss on the pressure surface.

An effect is obtained when the concave region having a negative curvature on the pressure surface of the blade is present in at least part within a range of 10% to 20% of the chord length, and a further effect is obtained when it is present so as to extend from a position having a chord length of no greater than 10% to a position having a chord length of at least 20%.

The above and other objects, features, and advantages of the present invention will become apparent from an explanation of preferred embodiments that are described in detail below by reference to the attached drawings.

BRIEF DESCRIPTION OF THE DRAWINGS

FIGS. 1A and 1B are diagrams showing an airfoil geometry of an embodiment and a curvature distribution on a suction surface SS and a pressure surface PS thereof, respectively.

FIGS. 2A and 2B are diagrams showing an airfoil geometry of a comparative example and a curvature distribution on a suction surface SS and a pressure surface PS thereof, respectively.

DESCRIPTION OF THE PREFERRED EMBODIMENT

Figure 3A:
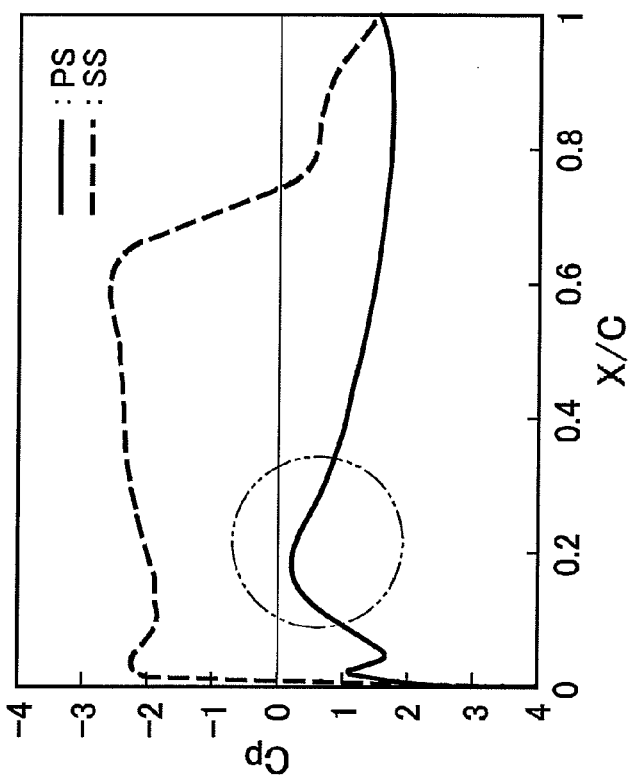
FIGS. 3A and 3B are graphs showing pressure distributions in the airfoil geometries of the embodiment and the comparative example, respectively.

A mode for carrying out the present invention is explained below by reference to the attached drawings.

The airfoil geometry of the present embodiment shown in FIGS. 1A and 1B is applied to a rotor blade forming a blade row of a rotor of an axial compressor of a jet engine for an aircraft, and includes a suction surface SS (suction side) denoted by a broken line and a pressure surface PS (pressure side) denoted by a solid line. Position in the chord direction on the suction surface SS and the pressure surface PS is expressed as X/C, where C is the chord length and X is the distance measured from a leading edge LE toward a trailing edge TE. In the present specification, a convex region is defined as a face having a positive curvature (bulging surface), and a concave region is defined as a face having a negative curvature (depressed surface).

As is clear from FIGS. 1A and 1B, the suction surface SS denoted by the broken line includes, from the leading edge LE side toward the trailing edge TE side, a suction surface concave region 17, a suction surface flat region 18, and a suction surface convex region 19. The suction surface concave region 17 is present in a range from the vicinity of the leading edge LE to a chord position of 20%, the suction surface flat region 18 having substantially zero curvature is present in a range from a chord position of 20% to a chord position of 40%, and the suction surface convex region 19 is present in a range from a chord position of 40% to the vicinity of the trailing edge TE. This is exactly the same as of the comparative example in FIGS. 2A and 2B.

Furthermore, the pressure surface PS denoted by the solid line includes, from the leading edge LE side toward the trailing edge TE side, a first pressure surface concave region 14, a first pressure surface convex region 15, and a second pressure surface concave region 16. The first pressure surface concave region 14 is present in a range from a chord position of 7% to a chord position of 22%, the first pressure surface convex region 15 is present in a range from a chord position of 22% to a chord position of 66%, and the second pressure surface concave region 16 is present in a range from a chord position of 66% to the vicinity of the trailing edge TE.

FIGS. 2A and 2B show the airfoil geometry of a comparative example that is similar to the airfoil geometry disclosed in Japanese Patent Application Laid-open No. 8-254156; a suction surface SS denoted by a broken line is exactly the same as of the embodiment mentioned above.

Furthermore, a pressure surface PS denoted by a solid line includes, from the leading edge LE side toward the trailing edge TE side, a pressure surface convex region 20 and a pressure surface concave region 21. The pressure surface convex region 20 is present in a range from the vicinity of the leading edge LE to a chord position of 53%, and the pressure surface concave region 21 is present in a range from a chord position of 53% to the vicinity of the trailing edge TE.

The airfoil geometry of the embodiment shown in FIGS. 1A and 1B can, by means of the suction surface concave region 17, and the airfoil geometry of the comparative example shown in FIGS. 2A and 2B can, by means of the suction surface concave region 17, achieve the operational effects of the airfoil geometry disclosed in Japanese Patent Application Laid-open No. 8-254156. That is, by generating a plurality of compression waves, the magnitude of the 1st passage shock can be moderated and deceleration of the airflow velocity is made gentle, thereby enabling the pressure loss on the suction surface of the rotor blade to be reduced and boundary layer separation to be suppressed.

Figure 3B:
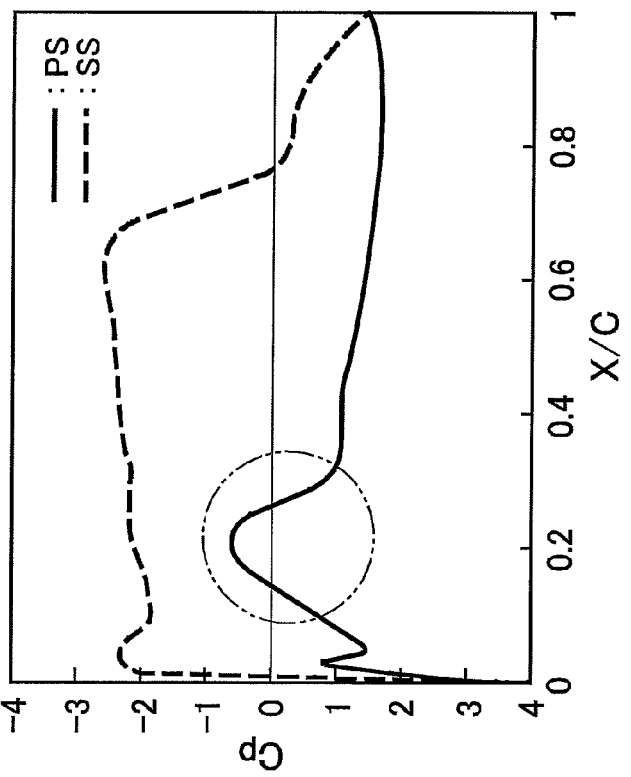

As is also clear from FIGS. 3A and 3B, it can be understood that the pressure distribution on the suction surface SS denoted by the broken line of the airfoil geometry of the present embodiment substantially coincides with that of the airfoil geometry of the comparative example, and the 1st passage shock is less affected by change on the pressure surface side in curvature shown in the embodiment.

On the other hand, when the geometry of the pressure surface PS is compared, as shown in FIGS. 2A and 2B the frontal part of the pressure surface PS of the airfoil geometry of the comparative example is occupied by the pressure surface convex region 20, and no concave region is present thereon. However, as shown by the region enclosed by an ellipse in FIGS. 1A and 1B, since the first pressure surface concave region 14 is formed so as to extend from a chord position of 7% to a chord position of 22% in the frontal part on the pressure surface PS of the airfoil geometry of the present embodiment, it becomes possible to decelerate the airflow velocity on the pressure surface PS by means of the first pressure surface concave region 14.

In the airfoil geometry of the comparative example, since the airflow velocity on the pressure surface PS is accelerated by means of the pressure surface convex region 20, a large 2nd passage shock is generated in the pressure surface convex region 20, thus giving rise to the problem that the pressure loss increases. However, in the airfoil geometry of the present embodiment, since the first pressure surface concave region 14, which decelerates the airflow velocity, is provided in front of the first pressure surface convex region 15, which accelerates the airflow velocity on the pressure surface PS, it is possible to lower the peak value of the airflow velocity on the pressure surface PS, thus weakening the 2nd passage shock generated in the first pressure surface convex region 15, and thereby reducing pressure loss due to the 2nd passage shock.

As shown by the regions enclosed by circles in the pressure distribution on the pressure surface PS of FIGS. 3A and 3B, it can be understood that in the comparative example a steep change in pressure occurs due to a large 2nd passage shock, whereas in the embodiment the change in pressure is reduced due to the 2nd passage shock being weakened.

Figure 4:
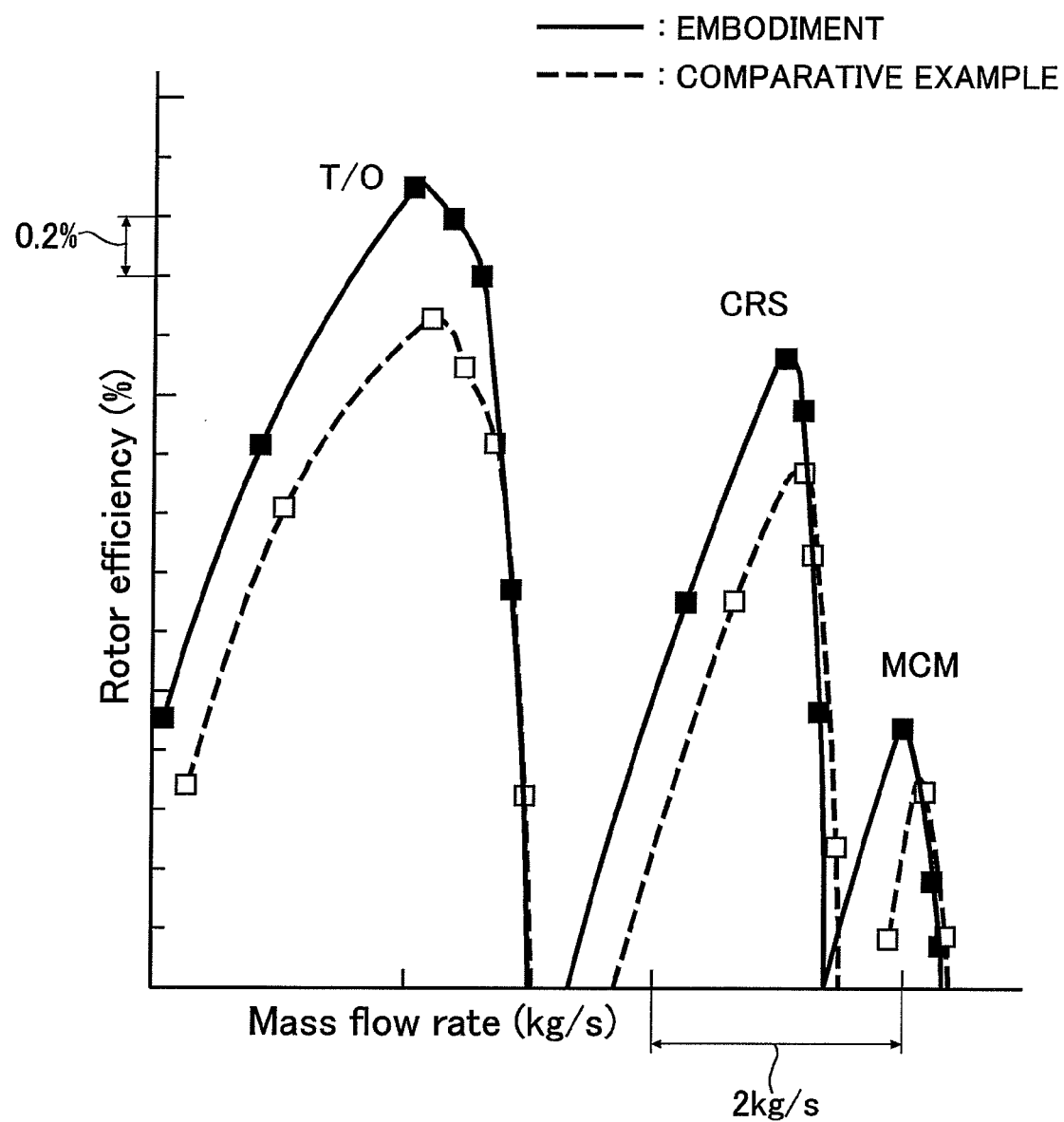
FIG. 4 is a graph showing rotor efficiency during takeoff, cruising, and maximum climb of the embodiment and the comparative example.
Figure 5:
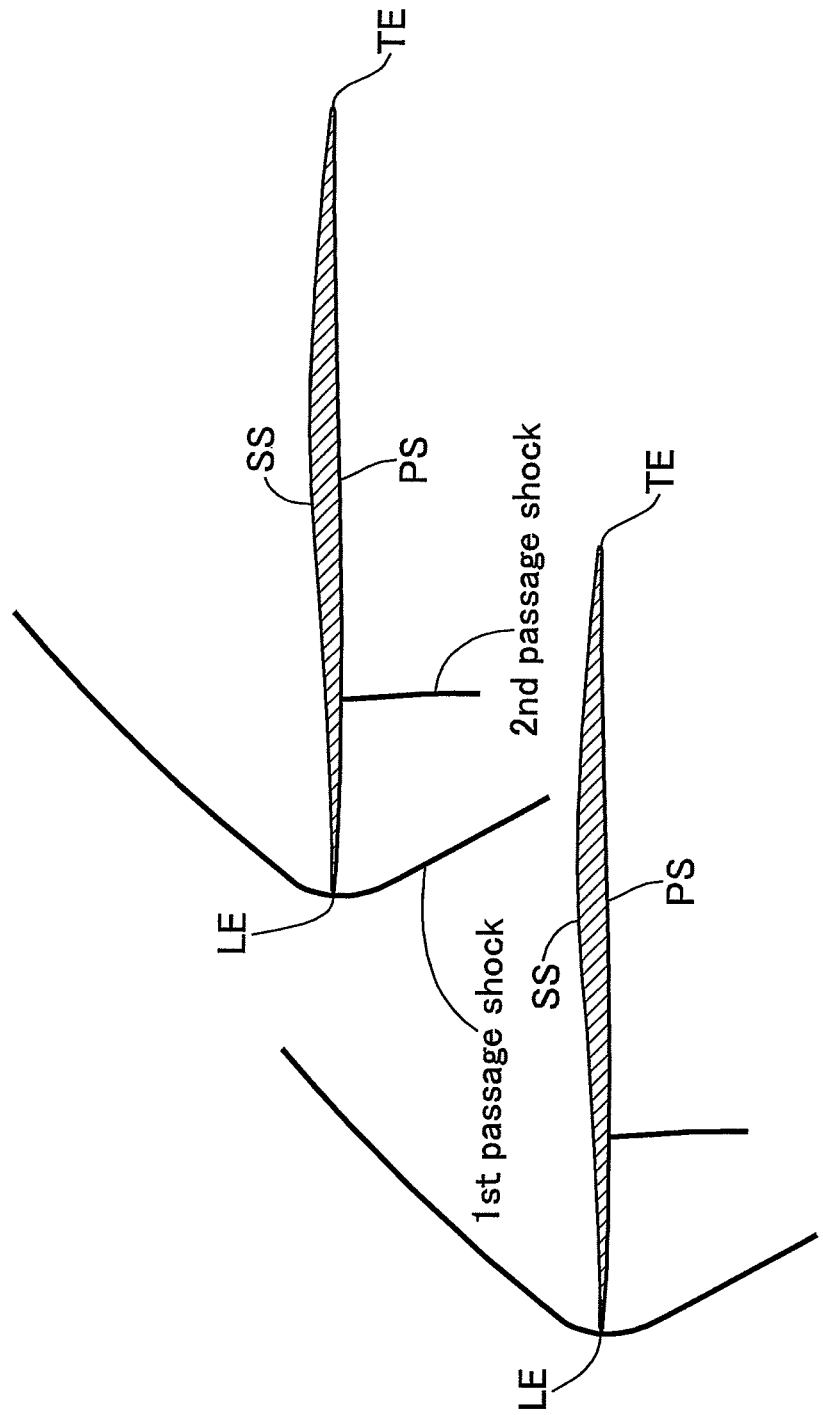
FIG. 5 is a diagram schematically showing 1st and 2nd passage shocks generated in a blade row of a conventional example.

FIG. 4 shows the dependency of rotor efficiency on the mass flow rate of the axial compressors of the present embodiment and the comparative example in airplanes equipped with jet engines to which they are applied, at times corresponding to takeoff, cruising, and maximum climb. As is clear from the figure, it can be understood that for all mass flow rates, the efficiency of the present embodiment is equal to or greater than the efficiency of the comparative example.

An embodiment of the present invention is explained above, but the present invention may be modified in a variety of ways as long as the modifications do not depart from the spirit and scope thereof.

For example, the airfoil geometry of the present invention may be applied not only to a rotor blade of an axial compressor but also to a stator blade of an axial compressor.

What is claimed is:

1. An airfoil geometry for an axial compressor, in which a blade forming a blade row of the axial compressor includes a leading edge and a trailing edge, and a suction surface and a pressure surface, the suction surface including a suction surface concave region having negative curvature, that is formed in a leading edge part of the suction surface at the leading edge of the blade, and a suction surface flat region having substantially zero curvature, that is continued from the suction surface concave region toward a trailing edge part of the suction surface at the trailing edge of the blade, and the pressure surface including a pressure surface first concave region having negative curvature in a frontal part of the pressure surface in a vicinity of the leading edge of the blade, and the pressure surface further includes a pressure surface second concave region having negative curvature forming a trailing edge part of the pressure surface at the trailing edge of the blade.

2. The airfoil geometry for an axial compressor according to claim 1, wherein at least part of the pressure surface first concave region is present within a range of 10% to 20% of the chord length from the leading edge of the blade toward the trailing edge of the blade.

3. The airfoil geometry for an axial compressor according to claim 2, wherein the pressure surface first concave region is present so as to extend from a position having a chord length of no greater than 10% to a position having a chord length of at least 20% from the leading edge of the blade toward the trailing edge of the blade.

4. The airfoil geometry for an axial compressing according to claim 1, wherein the suction surface of the blade further includes a suction surface convex region having positive curvature that is continued from the suction surface flat region to the trailing edge part of the suction surface at the trailing edge of the blade.

5. The airfoil geometry for an axial compressing according to claim 4, wherein the pressure surface further includes a pressure surface convex region having positive curvature continuing from the pressure surface first concave region toward a trailing edge part of the pressure surface at the trailing edge of the blade.

6. The airfoil geometry for an axial compressing according to claim 5, wherein the pressure surface second concave region continues from the pressure surface convex region.

7. The airfoil geometry for an axial compressing according to claim 5, wherein a center point of the pressure surface is disposed below, in a direction extending from the suction surface to the pressure surface, an imaginary chord line connecting a leading end of the blade at the leading edge of the blade and a trailing end of the blade at the trailing edge of the blade.

8. The airfoil geometry for an axial compressing according to claim 1, wherein the pressure surface further includes a pressure surface convex region having positive curvature continuing from the pressure surface first concave region toward a trailing edge part of the pressure surface at the trailing edge of the blade.

9. The airfoil geometry for an axial compressing according to claim 8, wherein the pressure surface second concave region continues from the pressure surface convex region.

10. The airfoil geometry for an axial compressing according to claim 8, wherein a center point of the pressure surface is disposed below, in a direction extending from the suction surface to the pressure surface, an imaginary chord line connecting a leading end of the blade at the leading edge of the blade and a trailing end of the blade at the trailing edge of the blade.

11. The airfoil geometry for an axial compressing according to claim 1, wherein a center point of the pressure surface is disposed below, in a direction extending from the suction surface to the pressure surface, an imaginary chord line connecting a leading end of the blade at the leading edge of the blade and a trailing end of the blade at the trailing edge of the blade.

* * * * *